(12) United States Patent  
Knutson et al.

(10) Patent No.: US 8,418,210 B2
(45) Date of Patent: Apr. 9, 2013

(54) SATELLITE TELEVISION SYSTEM GROUND STATION HAVING WIDEBAND MULTI-CHANNEL LNB CONVERTER/TRANSMITTER ARCHITECTURE WITH CONTROLLED UPLINK TRANSMISSION

(75) Inventors: Paul Gothard Knutson, Lawrenceville, NJ (US); Kumar Ramaswamy, Plainsboro, NJ (US); Max Ward Muterspaugh, Indianapolis, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 2479 days.

(21) Appl. No.: 10/084,773

(22) Filed: Feb. 26, 2002

(65) Prior Publication Data

US 2003/0163821 A1    Aug. 28, 2003

(51) Int. Cl.
*H04N 7/20* (2006.01)
*H04N 7/173* (2011.01)

(52) U.S. Cl. .............. 725/65; 725/63; 725/64; 725/67; 725/68; 725/105

(58) Field of Classification Search .............. 725/68
See application file for complete search history.

(56) References Cited

U.S. PATENT DOCUMENTS

| | | | |
|---|---|---|---|
| 5,027,430 A | 6/1991 | Yamauchi et al. | |
| 5,289,285 A | 2/1994 | Kotaka et al. | |
| 5,355,532 A | 10/1994 | Kubo et al. | |
| 5,805,975 A | 9/1998 | Green, Sr. et al. | 455/3.2 |

(Continued)

FOREIGN PATENT DOCUMENTS

| | | |
|---|---|---|
| CN | 1139846 | 1/1997 |
| CN | 2135884 | 6/1998 |

(Continued)

OTHER PUBLICATIONS

US Patent Application "Bi-directional Communication Apparatus" filed Dec. 21, 2001 under U.S. Appl. No. 10/029,645, pp. 1-21.

(Continued)

*Primary Examiner* — Justin Shepard
(74) *Attorney, Agent, or Firm* — Robert D. Shedd; Brian J. Cromarty

(57) ABSTRACT

A satellite television ground system, particularly for a make or break satellite television signal system, includes an outdoor unit and an indoor unit that are in communication with each other via a single coaxial cable and an optional separate single conductor for power. The satellite television ground system is operative to measure and reverse frequency conversion errors utilizing DSP techniques, allowing for more precise generation and transmission of uplink signals from the satellite television ground system. Control data for the system is sent via a low data rate connection on a power cable thereof, or by a narrowband signaling channel via a coax cable. The system also utilizes a single reference oscillator to drive the various frequency synthesizers and the like. The satellite television ground system utilizes related oscillators for the uplink and downlink sections. Carrier frequency offset in the downlink is measured in a carrier tracking loop part of a television signal demodulator. The carrier frequency offset of the downlink is utilized to synthesize various frequency signals for the uplink and downlink sections to correct frequency errors. For the uplink section, the carrier frequency offset of the downlink is reversed in the uplink. If the uplink is on a different frequency, the measured offset of the system master oscillator can be scaled by different synthesizer ratios.

14 Claims, 6 Drawing Sheets

U.S. PATENT DOCUMENTS

| | | | |
|---|---|---|---|
| 5,825,327 A | | 10/1998 | Krasner |
| 5,838,669 A | * | 11/1998 | Gerakoulis .................. 370/320 |
| 5,918,156 A | * | 6/1999 | Tanabe ........................ 455/12.1 |
| 5,959,592 A | | 9/1999 | Petruzzelli ................... 343/840 |
| 6,091,703 A | * | 7/2000 | Saunders et al. ............. 370/210 |
| 6,097,752 A | | 8/2000 | Wiedeman et al. |
| 6,222,819 B1 | | 4/2001 | Lysejko et al. ................ 370/209 |
| 6,240,074 B1 | | 5/2001 | Chandos et al. ............. 370/321 |
| 6,511,020 B2 | | 1/2003 | Higgins |
| 6,772,434 B1 | * | 8/2004 | Godwin ......................... 725/68 |
| 6,941,574 B1 | | 9/2005 | Broadwin et al. |
| 2002/0087991 A1 | * | 7/2002 | Ortega Rodriguez et al. .. 725/64 |
| 2002/0122511 A1 | * | 9/2002 | Kwentus et al. ............. 375/343 |
| 2002/0141356 A1 | * | 10/2002 | Beidas et al. ................. 370/324 |

FOREIGN PATENT DOCUMENTS

| | | | |
|---|---|---|---|
| CN | 1239848 | | 12/1999 |
| EP | 0300173 | | 1/1989 |
| EP | 0955737 | | 5/2004 |
| JP | 03097385 A | * | 4/1991 |
| JP | 11112376 | | 4/1999 |
| WO | WO 00/28665 | | 5/2000 |

OTHER PUBLICATIONS

SNAP Lab, Principals and Practice of GPS Surveying, Feb. 1999, http://www.gmat.unsw.edu.au/snap/gps/gps_survey/principles_gps.htm.

* cited by examiner

SATELLITE TELEVISION SYSTEM GROUND STATION HAVING WIDEBAND MULTI-CHANNEL LNB CONVERTER/TRANSMITTER ARCHITECTURE WITH CONTROLLED UPLINK TRANSMISSION

BACKGROUND

1. Field of the Invention

The present invention relates to satellite communication systems and, more particularly, to an interface which enables, among other things, interactive services in a communication system such as a satellite television system.

2. Background Information

The use of satellites to distribute television signals is known in the broadcasting industry and has helped revolutionize television distribution systems. The first generation of satellite television systems employed communication satellites that encircle the earth in so-called "geosynchronous" orbits, meaning that the satellites encircling the earth are stationary relative to fixed points on the earth. A geosynchronous satellite needs to maintain a high altitude in order to remain in geosynchronous orbit. One aspect of a geosynchronous orbit is that it enables a single satellite to distribute television signals to entire continents, large portions of continents, and/or large areas on the earth.

The next generation of satellite television systems involves the use of low earth orbit ("LEO") satellites and/or medium earth orbit ("MEO") satellites. As the names imply, these satellites occupy much lower orbits than geosynchronous satellites. An LEO and/or MEO satellite system is conducive for providing various interactive services such as interactive television services, internet services (e.g., electronic mail, web surfing, etc.) and the like, since the round trip signal propagation time is substantially less than in a geosynchronous satellite system. However, because of their lower orbits, multiple LEO/MEO satellites are required in order to distribute signals to the same geographical area as that of a geosynchronous satellite.

With LEO/MEO satellite systems omnidirectional antennas can be used, providing simple, spatially inefficient links that do not need to track satellites. Omnidirectional systems provide very low bandwidth due to the extremely low gain of the omnidirectional antenna in the link. To achieve high bandwidth and space division multiplex, a high gain antenna must be used and the satellites tracked. To therefore provide a high bandwidth continuous data link to non-geosynchronous satellites, the ability to track two satellites is required, since as one satellite passes over the horizon, a link to another satellite must have been established and operating to take over the link. By tracking two satellites, a make-before-break switch can be made between the satellites.

In the context of satellite television systems, the use of multiple non-geosynchronous satellites (i.e. LEO and MEO satellite systems) requires that a subscriber's television equipment be capable of tracking and receiving signals from multiple satellites. Accordingly, a subscriber's television equipment should include multiple receivers that operate in a simultaneous manner. Moreover, in order to accommodate interactive television services, it is also desirable for a subscriber's television equipment to include a means for transmitting signals to the satellites. In the case of the next generation television satellite system, the consumer's television equipment must therefore have a ground station that is capable of receiving two satellite signals and provide an uplink signal to a satellite. The ground station typically consists of an indoor unit and an outdoor unit.

Since the proposed ground station in the next generation television satellite system is a consumer apparatus, it is desirable to minimize the cost of the consumer ground station. One major cost in a consumer ground station is the connection from the indoor unit to the outdoor unit. In such a make-before-break system, there is a need to demodulate two satellite signals. Using a traditional LNB (Low Noise Block) downconverter, this implies carrying two wideband signals (up to ≈1 GHz each) on a single piece of cable. In addition, the uplink signal also needs to be carried on the same single cable.

In U.S. patent application Ser. No. 10/029645, entitled "Bi-directional Communication Apparatus" by Ramaswasmy et al. filed Dec. 21, 2001, a satellite television ground station is shown that is an example of a satellite television ground station that receives first and second satellite television signals. The first and second satellite television signals are down-converted in an outdoor unit of the satellite television ground station and transmitted to an indoor unit of the satellite television ground station. A signal transmitting module receives an RF signal from the indoor unit and up-converts the RF signal for selectively providing the up converted signal in response to a selection signal. A reference frequency from the indoor unit is provided to a reference oscillator generator in the outdoor unit. The reference oscillator generator provides an oscillator signal to various components of the outdoor unit The satellite television ground station, however, is only elementary in design and does not address the problems solved in the present invention.

What is therefore needed is a satellite system that, in one instance, overcomes the above and other current shortcomings and/or drawbacks of current satellite systems. What is therefore further needed is a ground-based satellite television system that, in one instance, overcomes the above and other shortcomings and/or drawbacks in current ground-based satellite television systems.

SUMMARY OF THE INVENTION

The subject invention is a ground-based satellite system. The ground-based satellite system includes an outdoor unit and an indoor unit. The outdoor and indoor units provide a downlink and an uplink.

In one form, the subject invention is an outdoor unit for a satellite television ground system. The outdoor unit includes downlink circuitry and uplink circuitry. The downlink circuitry is operative to receive first and second satellite television signals from first and second satellites, process the first and second satellite television signals, and provide the processed first and second satellite television signals to an indoor unit of the satellite television ground system. The uplink circuitry is operative to receive an uplink signal from the indoor unit, process the received uplink signal, and provide the processed uplink signal to a satellite transmitting antenna when the downlink circuitry is signal-locked with one of the first and second satellites.

In another form, the subject invention is an outdoor unit for a satellite television ground system. The outdoor unit includes means for receiving first and second satellite television signals from first and second satellites, means for processing the first and second satellite television signals, means for providing the processed first and second satellite television signals to an indoor unit of the satellite television ground system, means for receiving an uplink signal from the indoor unit, means for processing the received uplink signal, and means for providing the processed uplink signal to a satellite transmitting antenna when the downlink circuitry is signal-locked with one of the first and second satellites.

In yet another form, the subject invention is a method of providing an uplink communication with a television broadcasting satellite in an outdoor unit of a satellite television ground system. The method includes the steps of (a) receiving first and second satellite television signals from first and second satellites; (b) processing the first and second satellite television signals; (c) providing the processed first and second satellite television signals to an indoor unit of the satellite television ground system; (d) receiving an uplink signal from the indoor unit; (e) processing the received uplink signal; and (f) providing the processed uplink signal to a satellite transmitting antenna when the downlink circuitry is signal-locked with one of the first and second satellites.

The subject system provides only one uplink, since the data can be burst over that link. The uplink will occur only if a receiver is locked with the target uplink satellite to insure that the uplink power amplifier does not spew signal all over the heavens. The subject invention also utilizes a common oscillator for the downlink and uplink sections. The uplink section utilizes a frequency stabilized oscillator based on the common oscillator and an incoming television signal.

The subject invention allows frequency division multiplexing of selected channels of multiple downlinks with the uplink signal(s) to the outdoor unit. The coarse tuner pares down the bandwidth of the wideband signals being carried to the indoor unit. The wideband signal is made of many FDM (Frequency Division Multiplexing) channels. The frequency conversions that enable multiplexing are performed in such a way to cancel local oscillator drifts on the uplink path.

BRIEF DESCRIPTION OF THE DRAWINGS

The various features and advantages of this invention, and the manner of attaining them, will become more apparent and the invention will be better understood by reference to the following description of embodiment(s) of the invention taken in conjunction with the accompanying drawings, wherein.

Corresponding reference characters indicate corresponding parts throughout the drawings.

DETAILED DESCRIPTION

Figure 1:
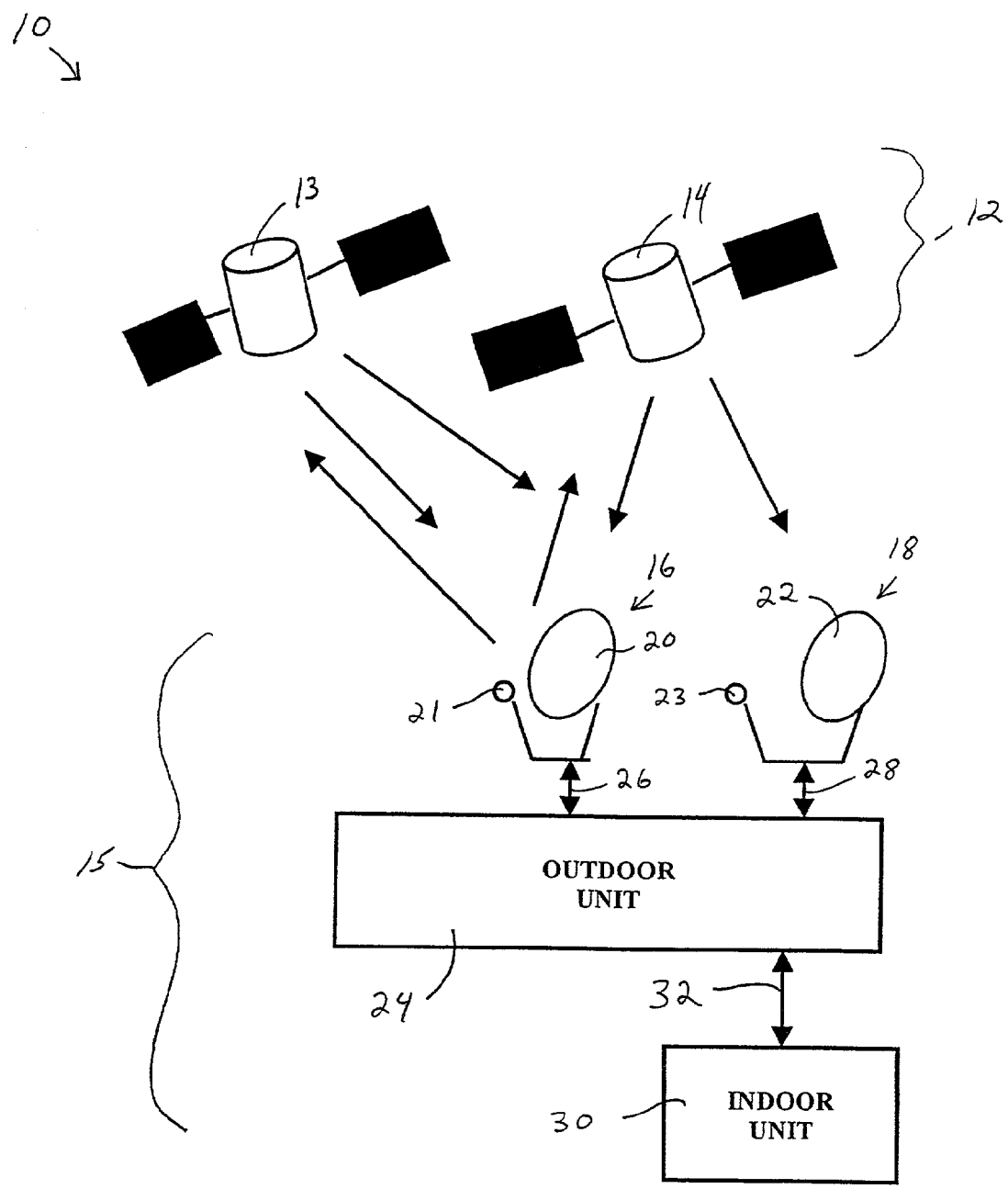
FIG. 1 is a block diagram of an exemplary satellite television system in which the subject invention may be utilized.

Referring to FIG. 1, there is shown an exemplary satellite television system, generally designated 10, in which the subject invention may be utilized. The satellite television system 10 is preferably an LEO or MEO, make-before-break type satellite television system. However, the satellite television system 10 is representative of any satellite television system in which more than one satellite is tracked (i.e. signals from more than one satellite are received) and a signal or signals are transmitted from a ground station to at least one of the satellites.

The satellite television system 10 employs a first subsystem or satellite system 12 and a second subsystem or ground system 15. The satellite system 12 has a first satellite 13 and a second satellite 14. The first and second satellites 13 and 14 are each operative to transmit television signals constituting a plurality of channels of video and/or audio data or programming (i.e. satellite television signals) and receive data signals from terrestrially based transmitters. Various arrows emanating from each satellite represent the satellite television signals, while the data signals are represented by arrows pointing towards the satellites. It should be appreciated that the satellite television system 10 can, and preferably does, include more than two satellites. However, only two satellites are typically utilized at any one time. As well, the nomenclature of "first" and "second" with respect to the satellites 13 and 14 is arbitrary The ground system 15 includes a first satellite antenna 16 and a second satellite antenna 18. The first satellite antenna 16 has a dish 20 and a feed horn 21. The dish 20 is typically in the shape of a parabola, modified parabola, or otherwise that provides a focal point or concentration of satellite television signals. Alternatively, the dish 20 is shaped to receive non-concentrated satellite television signals. The feed horn 21 is positioned at the focal point of the dish 20. Likewise, the second satellite antenna 18 has a dish 22 and a feed horn 23. The dish 22 is also typically in the shape of a parabola, modified parabola, or otherwise that provides a focal point or concentration of satellite television signals. Alternatively, the dish 22 is shaped to receive non-concentrated satellite television signals. The feed horn 23 is positioned at the focal point of the dish 22. The first satellite antenna 16 is operative to receive satellite broadcast television signals from either the first or second satellite 13 or 14 and transmit data to either the first or second satellite 13 or 14. The second satellite antenna 18 is operative to receive satellite broadcast television signals from either the first or second satellite 13 or 14.

It should be appreciated that the nomenclature of "first" and "second" with respect to the satellite antennas 16 and 18 is arbitrary. As well, the first and second satellite antennas 16 and 18 may be any other devices capable and/or operative to receive satellite broadcast television signals and transmit data to the satellites 13 and 14.

The ground system 15 also includes an outdoor unit 24 and an indoor unit 30. The outdoor unit 24 is associated with and/or in close proximity to the first and second antennas 16 and 18, while the indoor unit 30 is associated with and/or in close proximity to a television signal receiver such as a television, set-top box, or the like (not shown). The outdoor and indoor units 24 and 30 are in communication with each other via a single communication line or cable 32.

The outdoor unit 24 is operative to receive two satellite television signals, downconvert and coarse tune the received satellite television signals, and provide the conditioned satellite television signals (downlink signals) to the indoor unit 30. The outdoor unit 24 thus partitions the signals to minimize bandwidth to the indoor unit 30. Additionally, the outdoor unit 24 is operative to receive an uplink signal from the indoor unit 30, upconvert the received uplink signal, and provide the upconverted uplink signal for transmission. In accordance with an aspect of the subject invention, the outdoor unit 24 utilizes a related oscillator for the downlink and the uplink. Particularly, the outdoor unit 24 utilizes a single oscillator for the downlink and the uplink. More particularly, the outdoor unit 24 utilizes a single oscillator for the downlink and the uplink as received from the indoor unit 30. Additionally, the outdoor unit 24 transmits over the single RF cable 32 to the indoor unit 30.

The indoor unit 30 is operative to receive the downlink signals, measure frequency conversion errors in the downlink signals (downlink carrier frequency offsets) and adjust an uplink signal appropriately (e.g. removal of receiver carrier offset by prerotation in the modulator thereof, or scaling of the system reference by different synthesizer ratios). The indoor unit 30 measures frequency conversion errors that are then reversed for transmission (uplink). The indoor unit 30 also provides master reference oscillations and control signals for and to the outdoor unit 24 via the single RF cable 32. The indoor unit 30 is also operative to generate/produce and provide a reference clock or oscillator for itself and the outdoor unit 24. In this manner, the uplink and downlink utilize related oscillators.

Figure 2:
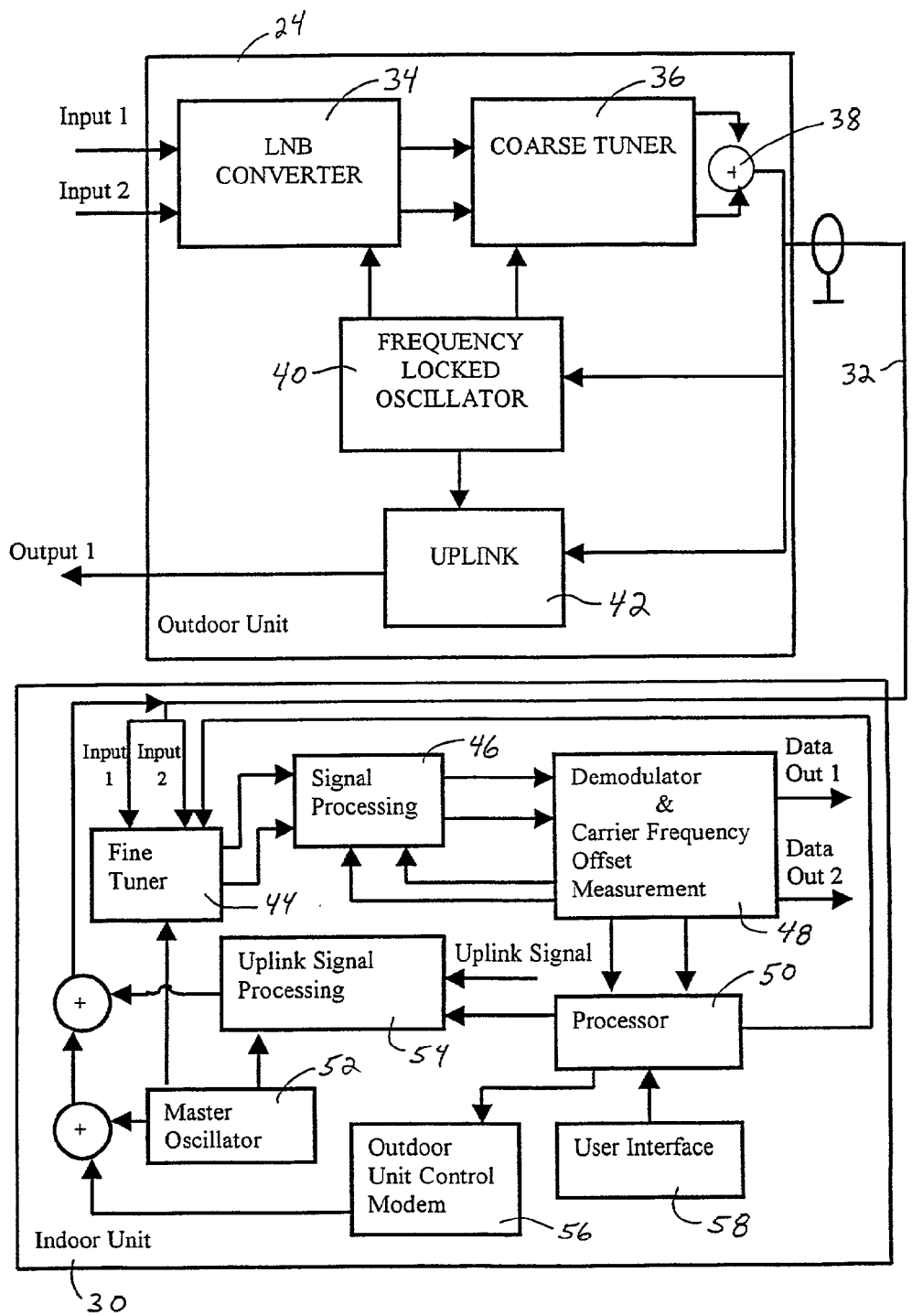
FIG. 2 is a simplified block diagram of an embodiment of an outdoor unit and indoor unit in accordance with the principles of the subject invention.

Referring to FIG. 2, there is depicted a simplified block diagram of an exemplary outdoor unit 24 and an exemplary indoor unit 30 that are in communication with each other via the single RF cable 32. The single RF cable 32 can be any type of satellite television signal conductor such as a standard satellite television cable (e.g. an RG-6 coaxial cable). Standard RG-6 coaxial cable is typically suited for transmission of frequencies of less than 2.0 GHz. Inputs from the two satellite antennas 16 and 18 are represented by Input 1 and Input 2. Inputs 1 and 2 are provided to an LNB converter 34. The LNB converter 34 is operative to separately block downconvert the satellite television signals provided on Inputs 1 and 2. The downconversion of each satellite television signal is accomplished through downconversion techniques that utilize a reference oscillation (an oscillatory signal of a particular frequency) provided by a frequency locked oscillator 40. The frequency locked oscillator 40 receives control signals and/or a reference oscillator or clock signal from the indoor unit 30 via the cable 32. The LNB converter 34 provides a first block downconverted satellite television signal and a second block downconverted satellite television signal.

The outdoor unit 24 also includes a coarse tuner 36. The separate outputs of the LNB converter 34 for the separate block downconverted satellite television signals (i.e. the first and second block downconverted satellite television signals) are provided to a coarse tuner 36. The coarse tuner 36 is operative to separately block tune the first and second block downconverted satellite television signals from the LNB converter 34. The coarse tuning of each block downconverted satellite television signal is accomplished through coarse tuning techniques utilizing a reference oscillation (an oscillatory signal of a particular frequency) provided by the frequency locked oscillator 40. Separate first and second coarse tuned outputs (downlink signals) are combined in a diplexer 38 that is coupled to the single cable 32. The downlink signals are thus provided to the indoor unit 30 via the cable 32. The downlink signals are frequency division multiplexed by the diplexer 38 before transmission to the indoor unit 30. In this manner, the indoor unit 30 receives the two downlink signals for further processing.

The LNB converter 34 is operative via control signals (originating from the indoor unit 30) to select the frequency to which the incoming satellite television signals (typically at 20-30 GHz) from the Inputs 1 and 2 are separately down converted and separately forwarded to the coarse tuner 36. Particularly, the LNB converter 34 is operative to convert the two incoming satellite television signals into two 500 MHz blocks of television signals. The course tuner 36 is operative via control signals (originating from the indoor unit 30) to coarse tune the outputs of the LNB converter 34 (i.e. the 500 MHz block of television signals) into two coarse tuned satellite television signals. The LNB converter 34 is also operative to select the polarization of the incoming signals to downconvert. The outputs of the coarse tuner 36 are combined or multiplexed by the diplexer/multiplexer 38 onto the coaxial cable 32.

The outdoor unit 24 also includes uplink circuitry/logic 42. The uplink circuitry/logic 42 is operative to receive an uplink signal from the indoor unit 30 via the cable 32 and provide a processed uplink signal to the transmission antenna (either antenna 16 or antenna 18) via an Output 1. The uplink circuitry/logic 42 is in communication with the frequency locked oscillator 40. As such, the uplink circuitry/logic 42 receives the reference oscillations (an oscillatory signal of a particular frequency) provided by the frequency locked oscillator 40 and utilizes it to upconvert the uplink frequency to be suitable for transmission to the satellite.

The frequency locked oscillator 40 of the outdoor unit 24 is coupled to and/or in communication with the cable 32 such that a master reference signal (i.e. master oscillatory signal of a particular frequency) from the indoor unit 30 may be provided thereto. The frequency locked oscillator 40 is operative to receive the master clock signal or master frequency oscillation/oscillator/oscillatory signal from the indoor unit 30 and utilize the same to perform an appropriate upconversion on the received uplink signal. Frequency conversion errors of the downlink signal(s) are measured and reversed in the uplink signal. Particularly, the control signals and/or the clock signals are utilized to frequency stabilize the downconversion and/or the uplink transmission.

The indoor unit 30 is coupled to and/or in communication with the cable 32. The cable 32 is in communication with a fine tuner 44 of the indoor unit 30. The fine tuner 44 is operative to separately fine tune the incoming signals. The fine tuner 44 receives clock and/or control signals from the master oscillator 52 such that any offset in frequency is compensated. The fine tuner 44 is in communication with signal processing circuitry/logic 46. The signal processing circuitry/logic 46 conditions the two incoming signals. The two incoming signals are processed by the processing circuitry/logic 46 in accordance with carrier frequency offset measurement signals. The carrier frequency offset measurement signals are produced by demodulator and carrier frequency offset measurement circuitry/logic 48. The demodulator and carrier frequency offset measurement circuitry/logic 48 is in communication with outputs of the signal processing circuitry/logic 46 and is operative to separately demodulate the television signals from the signal processing circuitry/logic 46 and to separately determine the carrier frequency offset for the two television signals.

The two demodulated television signals are provided as data out (Data Out 1 and Data Out 2) for a television signal receiver (not shown). The demodulator and carrier frequency offset measurement circuitry/logic 48 is in communication with a processor 50 of the indoor unit 30. The frequency error information/data obtained from each television signal is provided to the processor 50. The processor 50 utilizes the frequency error information/data for various purposes. The processor 50 is in communication with and under control of a user interface 58 such as a graphical user interface, remote control, and/or the like. Particularly, the processor 50 provides frequency error signals a result of the frequency error information/data from the demodulator and carrier frequency offset measurement circuitry/logic 48.

The processor 50 provides the frequency error signals to various components of the indoor unit 30. Particularly, the processor 50 provides the frequency error signals to uplink signal processing circuitry/logic 54 and to an outdoor unit control modem 56. Control signals from the outdoor unit control modem are provided to the cable 32 (and thus the outdoor unit 24) for communication with/to the outdoor unit 24. The uplink signal processing circuitry/logic 54 also receives an uplink signal generated by the indoor unit 30. The frequency error signal from the processor 50 is combined with the uplink signal and processed accordingly to provide a frequency compensated uplink signal. The frequency compensated uplink signal is summed with the outdoor unit control modem signal and a master oscillator (clock) signal from master oscillator processing circuitry/logic 52. The combined signals are provided to the outdoor unit 24 via the communication cable 32.

It should be appreciated that while two downlinks and one uplink are supported by the embodiments shown in the figures and especially the single coaxial cable 32, the number of downlinks and uplinks that may be supported by the single coaxial cable 32 and other embodiments is determined by the bandwidth of the links, cables, attenuation versus frequency, and complexity of filters required and employed.

Figure 3:
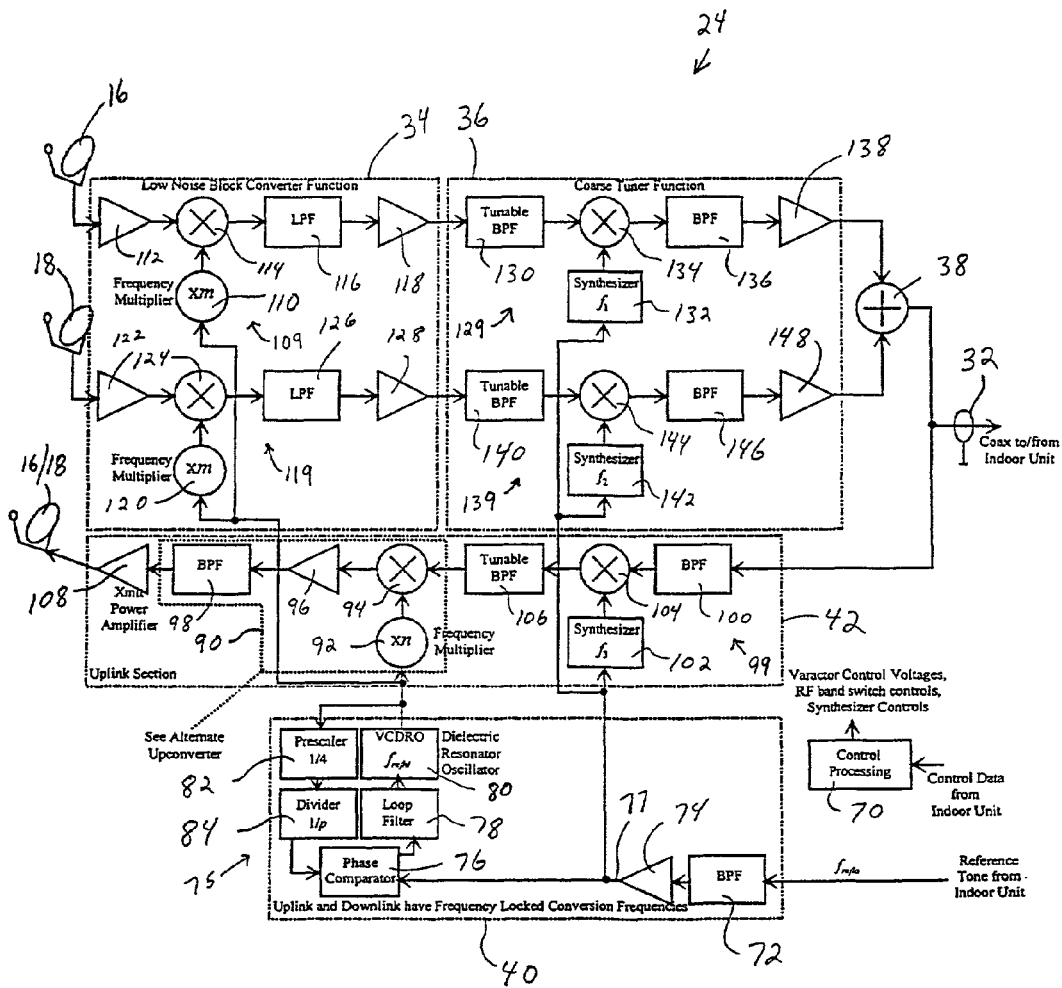
FIG. 3 is a block diagram of an embodiment of an outdoor unit in accordance with the principles of the subject invention.

Referring to FIG. 3, there is depicted a detailed exemplary embodiment of the outdoor unit 24. In accordance with an aspect of the subject invention, the outdoor unit 24 receives a master oscillator signal or reference tone signal ($f_{reflo}$) from the indoor unit 30. Particularly, the frequency locked oscillator 40 receives the master oscillator signal from the indoor unit 30 and utilizes the master oscillator signal to generate and/or produce an oscillator/clock signal for the outdoor unit 24. The master oscillator signal, reference oscillator signal, or reference tone is generated by the indoor unit 30 in accordance with measured frequency error data of the incoming signals (from the outdoor unit 24). More particularly, a band pass filter 72 of the frequency locked oscillator 40 receives the master oscillator signal and filters out any unwanted portion of the incoming signal. The oscillator signal is then provided to an amplifier 74. The intermediate oscillator signal from the amplifier 74 is provided to the uplink section 42, the coarse tuner 36, and to the other components of the frequency locked oscillator 40.

The intermediate oscillator signal from the amplifier 74 is provided directly to a first frequency upconverter 99 of the uplink section 42, a first frequency downconverter 129 of the coarse tuner 36, and a second frequency downconverter 139 of the coarse tuner 36. The first frequency upconverter 99 utilizes the intermediate oscillator signal to produce an intermediate uplink signal of a given frequency. The intermediate uplink signal is formed by multiplying in mixer 104 an uplink signal from the indoor unit 30 and a frequency synthesizer signal ($f_3$) generated by the first frequency upconverter 99 utilizing the intermediate oscillator signal. The intermediate uplink signal is further processed as described herein. The first frequency downconverter 129 of the coarse tuner 36 utilizes the intermediate oscillator signal 77 from the buffer 74 to produce a first intermediate coarse-tuned signal from the first block converted satellite television signal from the LNB block converter 34. The second frequency downconverter 139 of the coarse tuner 36 utilizes the intermediate oscillator signal 77 from the buffer 74 to produce a second intermediate coarse-tuned signal from the second block converted satellite television signal from the LNB block converter 34. The first and second intermediate coarse-tuned signals are further processed as described herein.

The frequency locked oscillator 40 further processes the intermediate oscillator signal 77 from the buffer 74 to produce a final oscillator signal. The final oscillator signal is provided to the LNB block converter 34 and an upconverter of the uplink section 42. Particularly, the intermediate oscillator signal 77 from the buffer 74 is provided to a phase-locked loop 75. More particularly, the intermediate oscillator signal 77 is provided to a phase comparator 76, the output of which is provided to a loop filter 78. The output of the loop filter 78 is provided to a voltage controlled dielectric resonator oscillator (VCDRO) 80. The VCDRO 80 provides the final oscillator signal ($f_{refni}$). The phase-locked loop 75 utilizes the final oscillator signal ($f_{refni}$) to complete the phase-locked loop. Particularly, the final oscillator signal ($f_{refni}$) is provided as an input to a ¼ prescaler 82. An output of the ¼ prescaler 82 is provided as in input to a 1/p divider 84. The output of the 1/p divider 84 is provided as an input to the phase comparator 76. The phase comparator 76 is operative to compare the phase of the prescaled and divided final oscillator signal ($f_{refni}$) with the phase of the intermediate oscillator signal 77 from the buffer 74. The phase locked loop 75 may be adjusted accordingly as per received control data.

The outdoor unit 24 also receives control data/control data signals from the indoor unit via the coax 32. The control data is received by control data processing circuitry/logic 70 of the outdoor unit 24. The control data processing circuitry/logic 70 processes the incoming control data and provides the control data to the appropriate components of the outdoor unit 24 (e.g. varactor controlling voltages, RF band switch controls, synthesizer controls, and the like). Particularly, the control data is provided to various synthesizers, varactors, and other components of the outdoor unit 24 as appropriate. The LNB converter 34, the coarse tuner 36, and the uplink section 42 utilize the control data and the master oscillator signal from the frequency locked oscillator 40. A single oscillator signal is utilized by the various portions or sections of the outdoor unit 24 for each function thereof, while the control data is utilized by the various portions or sections of the outdoor unit 24. Particularly, the control data controls the functionality and/or operation of the various components and/or portions of the outdoor unit 34.

The final oscillator signal ($f_{refni}$) is provided to the uplink converter 90 of the uplink section 42. The uplink converter 90 is operative to produce/generate a final uplink signal that is transmitted to a satellite via the transmitting antenna (dish) 16/18 utilizing the final oscillator signal ($f_{refni}$). Particularly, the final oscillator signal ($f_{refni}$) is provided to a frequency multiplier 92 that produces a signal of a frequency n times the input frequency $n \cdot f_{refni}$. The multiplier, n, of the frequency multiplier 92 is typically fixed, chosen to bring the intermediate uplink signal, typically centered at a frequency under 2 GHz, to a satellite uplink frequency band. The frequency multiplier signal from the frequency multiplier 92 is mixed with the intermediate uplink signal from the first frequency upconverter 99 after being processed by a tunable band pass filter (BPF) 106. The band pass filter 106 is tunable in response to the control data. The filtered intermediate uplink signal is then mixed in a mixer 94 with the frequency multiplier signal, buffered in a buffer 96, and output to a band pass filter (BPF) 98. The output of the band pass filter (final uplink signal) is provided to a transmitter power amplifier 108 before being transmitted via the transmitter 16/18. Since a common reference frequency is used for all frequency conversions, uplink and downlink, it is possible to compute the transmit frequency offset based on the measured offset from the downlink receiver. In this manner, the final uplink signal is frequency conversion error corrected (with respect to the incoming signal(s)) for transmission.

The final oscillator signal ($f_{refni}$) is also provided to the LNB converter 34. Particularly, the final oscillator signal ($f_{refni}$) is provided to a first LNB block converter 109 of the LNB converter 34, and a second LNB block converter 119 of the LNB converter 34. In both the first and second LNB block converters 109 and 119, the final oscillator signal ($f_{refni}$) is mixed or multiplied with first and second incoming satellite television signals as received by the respective antennas 16 and 18. An output of the first and second LNB block converters 109 and 119 is provided to the inputs of the coarse tuner 36.

The first LNB block converter 109 includes a frequency multiplier 110, an amplifier 112, a mixer or combiner 114, a low pass filter (LPF) 116, and an output amplifier 118. The input amplifier 112 is in communication with the antenna/dish 16. The mixer 114 is in communication with the input amplifier 112 and the frequency multiplier 110. The mixer 114 is in communication with the low pass filter 116 that is in communication with the output amplifier 118. The first satellite television signal from the dish/antenna 16 is provided to the input amplifier 112. The mixer 114 multiplies the first satellite television signal with the output of the frequency the multiplier 110. The frequency multiplier multiplies $f_{refni}$ by m to produce a selected frequency which, when mixed or multiplied with the frequency of the first satellite signal, yields a composite satellite television signal of another frequency useful for further processing. The composite satellite television signal is input to the low pass filter 116 to obtain a first downconverted satellite television signal. The first downconverted satellite television signal is input to the output amplifier 118, which, in turn, is input to a first input of the coarse tuner 36.

The second LNB block converter 119 includes a frequency multiplier 120, an amplifier 122, a mixer or combiner 124, a low pass filter (LPF) 126, and an output amplifier 128. The input amplifier 122 is in communication with the antenna/dish 18. The mixer 124 is in communication with the input amplifier 122 and the frequency multiplier 120. The mixer 124 is in communication with the low pass filter 126 that is in communication with the output amplifier 128. The second satellite television signal from the dish/antenna 18 is provided to the input amplifier 122. The mixer 124 mixes or combines the second satellite television signal with the frequency multiplier signal xm from the frequency multiplier 120. The frequency multiplier multiplies $f_{refni}$ by m to produce a selected frequency which, when mixed or multiplied with the frequency of the second satellite signal, yields a composite satellite television signal of another frequency useful for further processing. The composite satellite television signal is input to the low pass filter 126 to obtain a second block down-converted satellite television signal. The second block down-converted satellite television signal is input to the output amplifier 128, which, in turn, is input to a second input of the coarse tuner 36.

The first block down-converted signal is input to the first frequency downconverter 129 of the coarse tuner 36. The second block down-converted signal is input to the second frequency downconverter 139 of the coarse tuner 36. The first frequency downconverter 129 is operative to coarse tune the first block down-converted satellite television signal while the second frequency downconverter 139 is operative to coarse tune the second block down-converted satellite television signal. The first and second block down-converted satellite television signals are combined in a summer 38 for transmission via the cable 32. The first and second frequency downconverters 129 and 139 receive and utilize the control data from the indoor unit and the intermediate oscillator signal from the first frequency upconverter 99. Particularly, the first and second frequency downconverters 129 and 139 utilize the control data to adjust the frequency of a mixing or combining signal, while the intermediate oscillator signal is used to synthesize mixing or combining signals.

The first frequency downconverter 129 includes a tunable band pass filter (BPF) 130 that is in communication with a first output of the LNB block downconverter 34, a mixer or combiner 134 having a first input that is in communication with an output of the tunable band pass filter 130 and a second input that is in communication with an output of a signal synthesizer 132, a band pass filter (BPF) 136 having an input in communication with an output of the mixer 134, and an amplifier 138 having an input in communication with an output of the band pass filter 136 and an output in communication with the summer 38.

The tunable band pass filter 130 is operative to receive the control data and provide filtering of the input first block down-converted satellite television signal according thereto. The signal synthesizer 132 is operative to receive the intermediate oscillator signal from the amplifier 74 and synthesize a mixing signal $f_1$ to mix or combine with the first block down-converted satellite television signal via the mixer 134. The resultant signal from the combiner 134 is input to the band pass filter 136 to filter out any undesired noise/signals. The output of the band pass filter 136 is input to the amplifier 138. The first coarse tuned satellite television signal is thus provided via the cable 32 to the indoor unit 30.

The second frequency downconverter 129 includes a tunable band pass filter (BPF) 140 that is in communication with a second output of the LNB block downconverter 34, a mixer or combiner 144 having a first input that is in communication with the tunable band pass filter 140 and a second input that is in communication with an output of a signal synthesizer 142, a band pass filter (BPF) 146 having an input in communication with an output of the mixer 144, and an amplifier 148 having an input in communication with an output of the band pass filter 146 and an output in communication with the summer or duplexer 38.

The tunable band pass filter 140 is operative to receive the control data and provide filtering of the input second block down-converted satellite television signal according thereto. The signal synthesizer 142 is operative to receive the intermediate oscillator signal from the amplifier 74 and synthesize a mixing signal $f_2$ to mix or combine with the second block down-converted satellite television signal via the mixer 144. The resultant signal from the combiner 144 is input to the band pass filter 146 to filter out any undesired noise/signals. The output of the band pass filter 146 is input to the amplifier 148. The second coarse tuned satellite television signal is thus provided via the cable 32 to the indoor unit 30.

Since the first and second block down-converted satellite television signals from the LNB block downconverter 34 are the same frequency, the frequency of the synthesized signals $f_1$ and $f_2$ from the respective frequency synthesizers 132 and 142 are offset from one another. This offset provides first and second coarse tuned satellite television signals that are of a different frequency or frequency band for transmission on the cable 32 to the indoor unit 30.

Figure 4:
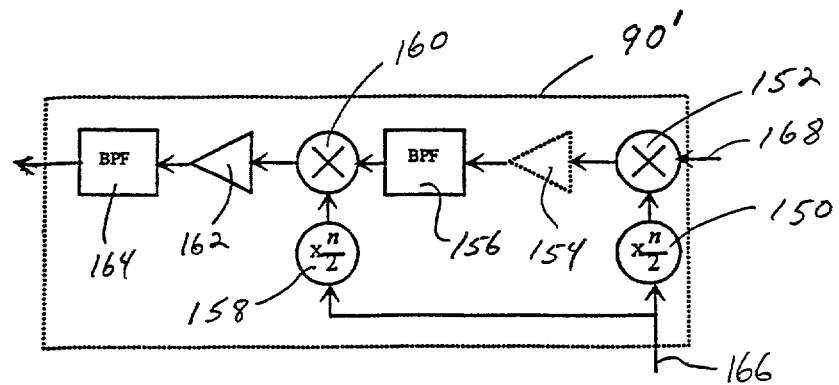
FIG. 4 is a block diagram of an embodiment of an alternative upconverter for the outdoor unit in accordance with the principles of the subject invention.

Referring now to FIG. 4, there is depicted an alternative embodiment of the uplink converter 90 of the uplink section 42, generally designated 90'. The alternative uplink converter 90' may be used in place of the uplink converter 90 of FIG. 3. In essence, this converter shifts the uplink signal to the uplink satellite band in two steps. The uplink converter 90' has a mixer or multiplier 152 having a first input that receives the intermediate uplink signal from the tunable band pass filter 106 on line 168 and a second input that receives a signal from the frequency multiplier 150. The frequency multiplier 150 is operative to receive the final oscillator signal $f_{refhi}$ on line 166 from the phase locked loop 75 and to multiply the final oscillator signal $f_{refhi}$ by 1. The choices of the multiplier I for item 150 and the multiplier k for item 158 as described below are made in accordance with normal design techniques for high frequency or microwave circuit design. The factors l, k and n are all integer numbers such that n equals the product of l times k (n=l×k). The resultant signal from the mixer 152 is provided to an amplifier 154. An output of the amplifier 154 is provided to a band pass filter 156. The output of the band pass filter 156 is provided to one input of a mixer or combiner 160. Another input of the mixer 160 receives a frequency multiplied oscillator signal from a frequency multiplier 158. The frequency multiplier 158 is operative to receive the final oscillator signal $f_{refhi}$ on line 166 from the phase locked loop 75 and to multiply the final oscillator signal by k. The resultant signal from the mixer 160 is provided to an amplifier 162. An output of the amplifier 162 is provided to a band pass filter 164. The output of the band pass filter is the uplink signal that is amplified by the amplifier 108 before transmission by the antenna 16/18. Following standard frequency multiplier design techniques, n and n/2 must be integer numbers. This alternate uplink converter 90' may simplify the filter design of the band pass filters in the uplink as well as the frequency multipliers.

Figure 5:
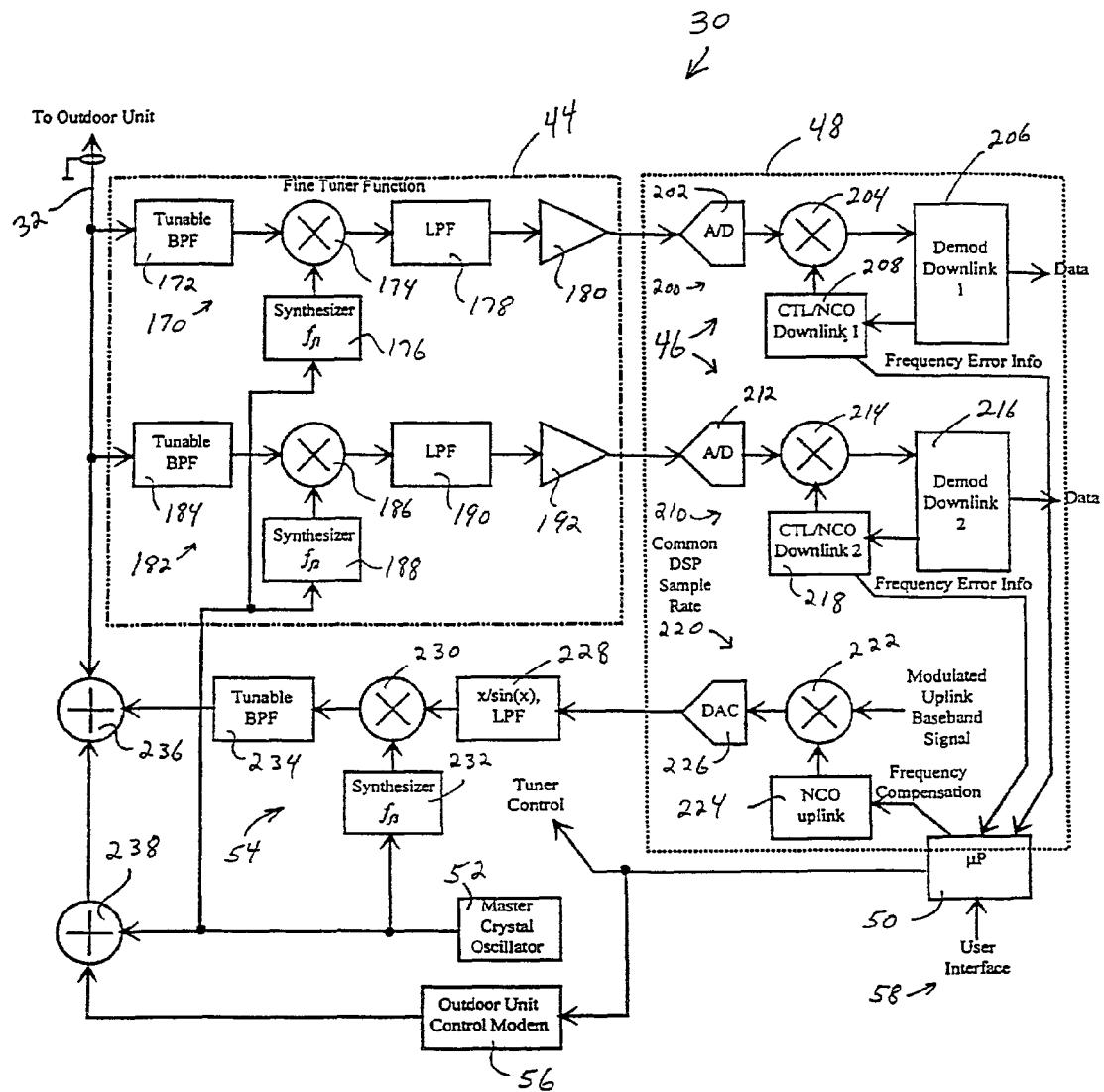
FIG. 5 is a block diagram of an embodiment of an indoor unit in accordance with the principles of the subject invention.

Referring now to FIG. 5, there is depicted a detailed exemplary embodiment of the indoor unit 30. The fine tuner 44 is operative to receive the first and second coarse tuned satellite television signals from the outdoor unit 24 via the cable 32. The fine tuner 44 includes a first fine tuner section 170 and a second fine tuner section 182. The first fine tuner section 170 is operative to fine tune the first coarse tuned satellite television signal to a particular channel. The second fine tuner section 182 is operative to fine tune the second coarse tuned satellite television signal to a particular channel. The particular channels tuned by the first and second fine tuner sections 170 and 182 can be the same channel or can be a different channel. The first and second fine tuner sections 170 and 182 are operative to further receive and utilize the control data.

Particularly, the first fine tuner 170 includes a tunable band pass filter 172 that has an input in communication with the cable 32. The tunable band pass filter 172 is operative to receive the first coarse tuned satellite television signal. The first fine tuner 170 also has a mixer or combiner 174 that has a first input that receives the signal from the tunable band pass filter 172, and a second input that receives a first synthesized signal $f_{f1}$ from a signal synthesizer 176. The synthesized signal $f_{f1}$ utilizes the master oscillator signal from the master crystal oscillator to produce the first synthesized signal $f_{f1}$. The output of the mixer 174 (a resultant or combined signal) is input to a low pass filter (LPF) 178. The output of the low pass filter 178 is input to an amplifier 180. The output of the amplifier 180 is a first fine tuned satellite television signal.

The second fine tuner 182 includes a tunable band pass filter 184 that has an input in communication with the cable 32. The tunable band pass filter 184 is operative to receive the second coarse tuned satellite television signal. The second fine tuner 182 also has a mixer or combiner 186 that has a first input that receives the signal from the tunable band pass filter 184, and a second input that receives a second synthesized signal $f_{f2}$ from a signal synthesizer 188. The synthesized signal $f_{f2}$ utilizes the master oscillator signal from the master crystal oscillator to produce the first synthesized signal $f_{f2}$. The output of the mixer 186 (a resultant or combined signal) is input to a low pass filter (LPF) 190. The output of the low pass filter 190 is input to an amplifier 192. The output of the amplifier 192 is a second fine tuned satellite television signal.

The outputs of the fine tuner 44 are input to the demodulator and carrier frequency offset measurement circuitry/logic 48, particularly the processing portion 46. Particularly, the first fine tuned satellite television signal is received by a first demodulator and carrier frequency offset measurement section 200, while the second fine tuned satellite television signal is received by a second demodulator and carrier frequency offset measurement section 210. The first and second demodulator and carrier frequency offset measurement sections 200 and 210 are operative to demodulate the input satellite television signal and provide the demodulated data as Data Out 1 and Data Out 2. The demodulated data is then utilized by a television signal receiver (not shown) such as a television. A carrier frequency offset is measured by each demodulator and carrier frequency offset measurement section 200 and 210.

Particularly, the first demodulator and carrier frequency offset measurement section 200 has an analog to digital converter (A/D) 202 that is in communication with and receives the first fine tuned satellite television signal from the first fine tuner section 170 of the fine tuner 44. An output of the A/D converter 202 (a digital television signal) is input to one input of a mixer or multiplier 204. Another input of the mixer 204 receives a numerically controlled oscillator (NCO) signal from the CTL/NCO circuitry/logic 208. An output of the mixer 204 is input to the demodulator 206, with an output of the demodulator 206 output as Data Out 1. The Data Out 1 is a first demodulated digital television signal. The demodulator 206 is also operative to provide a carrier signal (phase error signal) regarding the phase error of the carrier of the first satellite signal to the CTL/NCO circuitry/logic 208. The CTL/NCO 208 is operative to provide a numerically controlled oscillator signal that is combined in the mixer 204 with the digital television signal from the A/D converter 202. The CTL/NCO 208 is further operative to provide frequency error data (i.e. measure frequency error) regarding the first satellite signal to the processor 50.

The second demodulator and carrier frequency offset measurement section 210 has an analog to digital converter (A/D) 212 that is in communication with and receives the second fine tuned satellite television signal from the second fine tuner section 182 of the fine tuner 44. An output of the A/D converter 212 (a digital television signal) is input to one input of a mixer or multiplier 214. Another input of the mixer 214 receives a numerically controlled oscillator (NCO) signal from the CTL/NCO circuitry/logic 218. An output of the mixer 214 is input to the demodulator 216, with an output of the demodulator 216 output as Data Out 2. The Data Out 2 is a second demodulated digital television signal. The demodulator 216 is also operative to provide a carrier signal (phase error signal) regarding the phase error of the carrier of the second satellite signal to the CTL/NCO circuitry/logic 218. The CTL/NCO 218 is operative to provide a numerically controlled oscillator signal that is combined in the mixer 214 with the digital television signal from the A/D converter 212. The CTL/NCO 218 is further operative to provide frequency error data (i.e. measure frequency error) regarding the second satellite signal to the processor 50.

The processor 50 utilizes the frequency error signal, data or information, to provide a frequency compensation signal to a numerically controlled oscillator (NCO) uplink section 224. The NCO uplink section 224 is operative to generate and provide a frequency compensated oscillator signal to a first input of a mixer or multiplier 222. A second input of the mixer 222 receives a modulated uplink baseband signal generated by the indoor unit 30, typically in response to user input via the user interface 58 and the processor 50. The resultant signal is input to a digital to analog converter (DAC) 226.

The digital uplink signal from the DAC 226 is input to a low pass filter (LPF) 228. The low pass filter 228 provides filtering according to x/sin(x). The filtered digital uplink signal is mixed or combined in a mixer 230 with a synthesized signal $f_{f3}$ produced by a frequency synthesizer 232. The frequency synthesizer 232 utilizes the master oscillator signal from the master crystal oscillator 52 to produce a resultant uplink signal (upconverted uplink signal) of a particular frequency. The upconverted uplink signal is provided to an input of a tunable band pass filter 234. The output of the band pass filter 234 is provided to the summer 236. In this manner, an uplink signal is produced and conditioned by the indoor unit 30 and transmitted to the outdoor unit 24 for transmission to a satellite.

Figure 6:
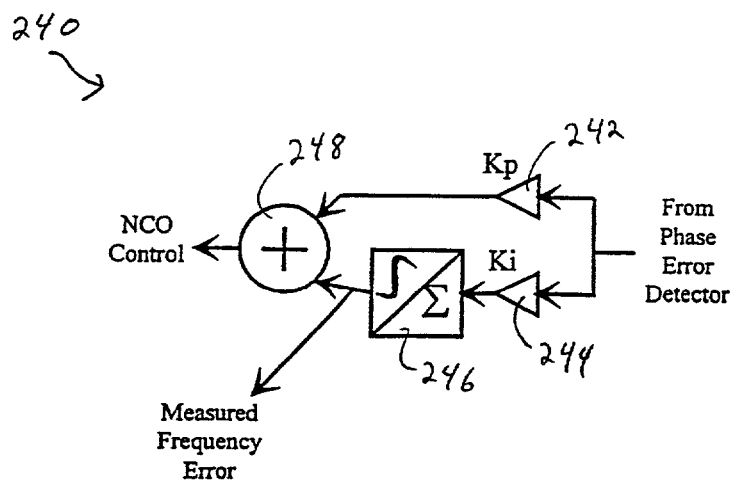
FIG. 6 is a block diagram of an embodiment of an alternative second order carrier tracking loop filter in accordance with the principles of the subject invention.

Referring to FIG. 6, there is depicted an exemplary embodiment of another carrier tracking loop (CTL) for use in the indoor unit 30. Particularly, FIG. 6 depicts an exemplary second order carrier tracking loop, loop filter generally designated 240 that can be used in the indoor unit 30 for each CTL/NCO 208 and 218. Particularly, the CTL 240 has first and second circuitry/logic 242 and 244 for receiving the phase error detection signal portions Kp and Ki. The output of Ki 244 is provided to integrator circuitry/logic 246, the output of which is provided as the measured frequency error and as an input to a summer 248. The output of Kp 242 is provided as another input to the summer 248. The resultant signal from the summer 248 is a numerically controlled oscillator (NCO) signal.

The processor 50 also generates data signals that are provided to the tuner (not shown) of the indoor unit 30 for control thereof. The processor 50 also generates and provides data signals to the outdoor unit control modem 56 which are summed with the master oscillator signal from the master crystal oscillator 52 in a summer 238. This resultant signal is then summed with the uplink signal from the tunable band pass filter 234 in a summer 236. The resultant signal is provided to the outdoor unit 24 via the cable 32.

Figure 7:
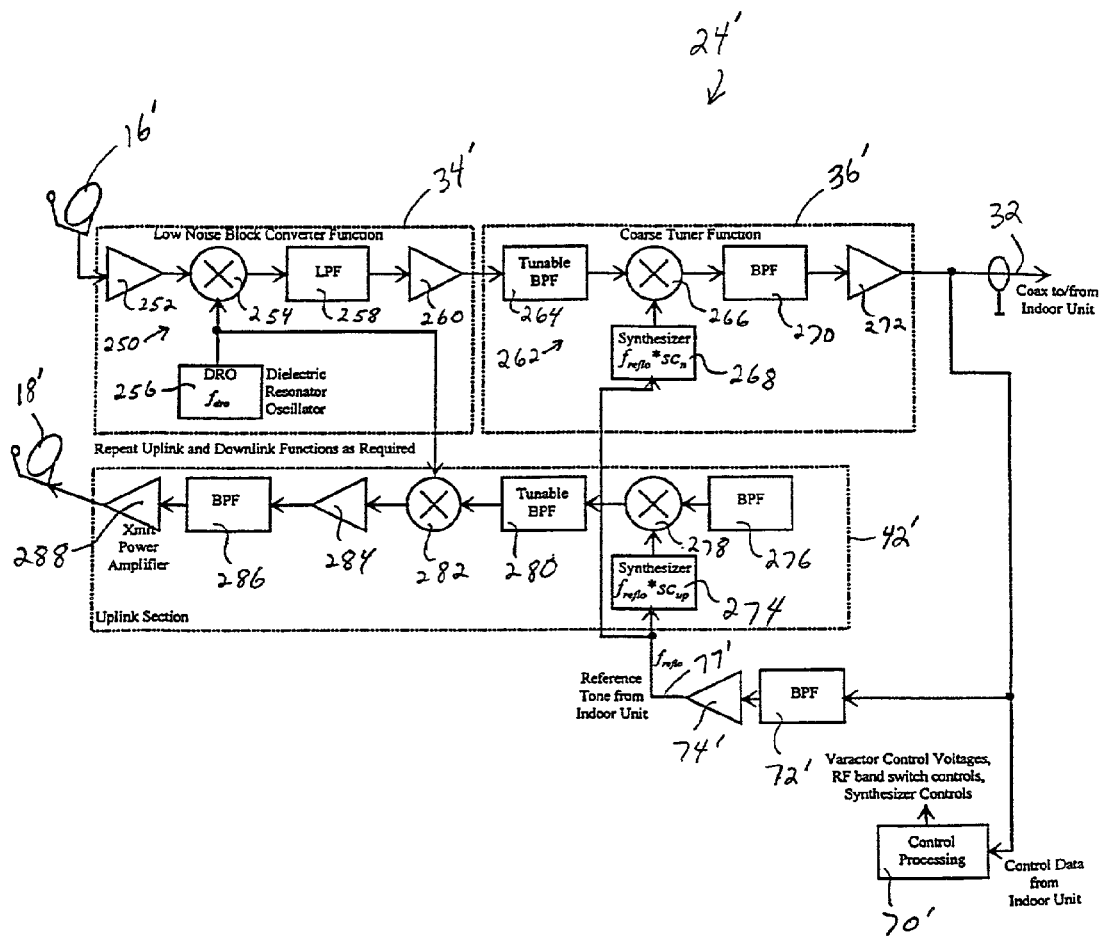
FIG. 7 is a block diagram of an embodiment of an outdoor unit having an unlocked dielectric resonator oscillator.

Referring to FIG. 7, there is depicted an exemplary alternative embodiment of an outdoor unit generally designated 24'. While the exemplary embodiment of the outdoor unit 24 utilizes a locked dielectric resonator oscillator (i.e. the oscillator of the outdoor unit 24 is locked to/by a master oscillator signal to a signal of a particular frequency), the outdoor unit 24' utilizes an unlocked dielectric oscillator. It should be appreciated that other types of locked and unlocked oscillators may be used. The outdoor unit 24' has a satellite television signal receiving dish 16', incoming television signal processing including an LNB block converter 34' and a coarse tuner 36', an uplink section 42', and a signal transmitting dish 18'. The outdoor unit 24' includes control data processing circuitry/logic 70' that is operative to receive control data/information/signals generated and transmitted by the indoor unit (not shown in FIG. 7) via the cable 32'. The control data processing circuitry/logic 70' is further operative to provide the appropriate control data to the various components of the outdoor unit 24' such as filter tuning, varactor control voltages, RF band switch controls, synthesizer parameters/controls, transmit power control, polarization selection, and the like.

The receiving dish 16' is operative to receive satellite broadcast television signals (typically, digital satellite television signals) and provide the received satellite broadcast television signals to the LNB block converter 34'. Particularly, the receiving dish 16' is in communication with an amplifier 252 of the LNB block converter 34'. The amplifier 252 provides an amplified satellite television signal to one input of a mixer or combiner 254. Another input of the mixer 254 receives an oscillator or clock signal $f_{dro}$ (a signal of a particular frequency) from an unlocked dielectric resonator oscillator (DRO) 256. As with all other mixers or multipliers, the two input signals of different frequencies results in n output signals centered about the sum and difference of the input frequencies. In the case of downconverting, the output signal is of a lower frequency, selected by a low-pass or band-pass filter. In the case of upconverting, the output signal is of a higher frequency, selected by a high-pass or band-pass filter. In the present case, the resultant signal from the mixer 254 is provided to an input of a low pass filter (LPF) 258. An output of the low pass filter 258 is provided to an input of an amplifier 260.

The block downconverted satellite television signal from the amplifier 260 is provided to the coarse tuner 36' for coarse tuning (frequency range tuning) of the block downconverted satellite television signal and, particularly to a single coarse tuner section 262. More particularly, the block downconverted satellite television signal is provided to a tunable band pass filter (BPF) 264 of the coarse tuner section 262. The tunable band pass filter receives control data from the control data processing circuitry/logic 70'. The control data sets the filter response (frequency response) as with all tunable band pass filters. An output of the tunable band pass filter 264 is provided to one input of a mixer or combiner 266. Another input of the mixer 266 receives a synthesizer signal ($f_{reflo}*sc_n$) from a signal or oscillator synthesizer 268. The signal synthesizer 268 has in input that receives the reference tone or master oscillator signal $f_{reflo}$ from the amplifier 74' and processes the master oscillator signal $f_{reflo}$ to obtain a synthesizer signal ($f_{reflo}*sc_n$) of a particular frequency. The frequency allows the to coarse tuning of the satellite television signal. The output of the mixer 266 is provided to an input of a band pass filter 270. The band pass filter 270 has a response that allows the particular chosen band of frequencies to pass (coarse tuning). The output of the band pass filter 270 is provided to an amplifier 272 that then provides the amplified coarse tuned satellite television signal to be transmitted over the cable 32 to the indoor unit.

The uplink section 42' of the outdoor unit 24' is operative to receive an uplink signal from the indoor unit via the cable 32, process the uplink signal accordingly, including correction of frequency conversion errors, and provide the uplink signal to the dish 18 for transmission to a satellite. A band pass filter (BPF) 276 of the uplink section 42' receives the uplink signal and filters the uplink signal accordingly. An output of the band pass filter 276 is provided to one input of a mixer or combiner 278. Another input of the mixer 278 receives a synthesized signal ($f_{reflo}*sc_n$) from a signal synthesizer 274. The signal synthesizer 274 provides a synthesized signal of a particular frequency from the master or reference oscillator signal $f_{reflo}$ from the amplifier 74'. The frequency of the signal ($f_{reflo}*sc_n$) upconverts the uplink signal to a higher frequency in the mixer 278. An output of the mixer 278 is provided to a tunable band pass filter 280 (which receives appropriate control signals) that passes the appropriate higher frequency uplink signal to one input of a mixer or combiner 282. Another input of the mixer 283 receives the oscillator signal $f_{dro}$ from the dielectric resonator oscillator 256. Again, the frequency of the signal $f_{dro}$ when mixed with the input uplink signal, produces a higher frequency uplink signal that is obtained by providing the output of the mixer 282 through an amplifier 284 and band pass filter 286. The output of the band pass filter 286 is provided to a transmitter power amplifier 288. The amplified final uplink signal is provided to the transmitting antenna 18'.

It should be appreciated that the subject satellite television signal ground system provides a single uplink. Uplink data (uplink signal) may thus be burst over the data link. In accordance with an aspect of the subject invention, since the various synthesized signals and other parameters/constraints of the uplink is dependent upon the incoming signal carrier offset measurement, the uplink is dependent upon the receipt of an incoming signal. Thus, the uplink can only transmit when an incoming signal is received by the downlink. Further, the transmitter can and should be disabled if one or more of the oscillators are not locked to the incoming signal. In addition, the transmitter may be configured to be disabled unless a code or specific message is received by either Data Out 1 or Data Out 2. In this manner, the transmitter does not transmit when a satellite is not in position to receive the signal. If an incoming signal is not being received and locked in, it is assumed that a target uplink satellite is not there (corresponding to the downlink satellite) and that the transmitter should be disabled.

In accordance with an aspect of the subject invention, a key to successful operation of the subject invention is the utilization of related oscillators for the uplink and downlink(s). This may be manifested or embodied in a master oscillator that is utilized in all aspects of both the indoor unit 30 and the outdoor unit 24. Carrier frequency offset in the downlink(s) is measured, preferably in the carrier tracking loop portion of the digital demodulator of the indoor unit 30. More particularly, carrier offset measurement is preferably taken from the integrator of the loop filter in the carrier tracking loop in the demodulator. If the uplink is on a different frequency, the measured offset of the system reference (master) oscillator can be scaled by different synthesizer ratios. Given that all local oscillators are locked together, the following relations can be made:

(a) $m \cdot f_{refhi} = 4 \cdot p \cdot m \cdot f_{reflo}$ Downlink 1 Band Conversion Frequency;
(b) $m \cdot f_{refhi} = 4 \cdot p \cdot m \cdot f_{reflo}$ Downlink 2 Band Conversion Frequency;
(c) $n \cdot f_{refhi} = 4 p \cdot n \cdot f_{reflo}$ Uplink Band Conversion Frequency;
(d) $f_1 = a_1/b_1 \cdot f_{reflo}$ Downlink 1 Coarse Conversion Frequency;
(e) $f_2 = a_2/b_2 \cdot f_{reflo}$ Downlink 2 Coarse Conversion Frequency;
(f) $f_3 = a_1/b_3 \cdot f_{reflo}$ Uplink Coarse Conversion Frequency;
(g) $f_{f1} = a_{f1}/b_{f1} \cdot f_{reflo}$ Downlink 1 Fine Conversion Frequency;
(h) $f_{f2} = a_{f2}/b_{f2} \cdot f_{reflo}$ Downlink 2 Fine Conversion Frequency; and
(i) $f_{f3} = a_{f3}/b_{f3} \cdot f_{reflo}$ Uplink Fine Conversion Frequency.

The frequency error measured for the downlink 1 is scaled by the sum $(4 \cdot p \cdot m + a_1/b_1 + a_{f1}/b_{f1})$. Likewise, the frequency error measured for the downlink 2 is scaled by the sum $(4 \cdot p \cdot m + a_2/b_2 + a_{f2}/b_{f2})$. The uplink frequency error will be scaled by the sum $(4 \cdot p \cdot n + a_3/b_3 + a_{f3}/b_{f3})$. The ratio $(4 \cdot p \cdot n + a_3 b_3 + a_{f3}/b_{f3})/(4 \cdot p \cdot m + a_1/b_1 + a_{f1}/b_{f1})$ multiplied by the frequency offset measured in the downlink 1 carrier tracking loop will compensate the frequency offset in the uplink conversion chain if used to drive the uplink NCO (Numerically Controlled Oscillator). Likewise the ratio $(4 \cdot p \cdot n + a_3/b_3 + a_{f3}/b_{f3})/(4 \cdot p \cdot m + a_2/b_2 + a_{f2}/b_{f2})$ multiplied by the frequency offset measured in the downlink 2 carrier tracking loop will compensate the frequency offset in the uplink conversion chain if used to drive the uplink NCO (Numerically Controlled Oscillator).

If there are multiple frequency references in the system, one could also compute the reference offset by examining multiple RF channels (assuming that the channels are precisely related), or by tuning the channel by different combinations of coarse and fine tuning and then solving for the unknown frequencies. However, it may not be practical to make these measurements. Locking all oscillators as presented in the subject invention is the most ideal. Carrier offset measurement is preferably taken from the integrator of the loop filter in the carrier tracking loop in the demodulator. If the dielectric resonator oscillator ran open loop, one would need to solve two equations to determine what part of the error comes from the dielectric resonator oscillator (DRO) and which part comes from the low frequency reference (master oscillator). Since (assuming) the DRO is fixed, one would need to examine two unique channels to obtain a solvable system of equations.

As an example, assume the following:
(a) $f_{dro}$ DRO Frequency;
(b) $f_{reflo}$ Low Frequency Reference For Coarse and Fine Synthesizers;
(c) $f_{NCOup}$ Uplink NCO Frequency;
(d) $f_{c1}$ Channel 1 Frequency;
(e) $f_{c2}$ Channel 2 Frequency;
(f) $f_{up}$ Uplink Channel Frequency;
(g) $\delta$ DRO Frequency Deviation;
(h) $\epsilon$ Low Frequency Reference Frequency Deviation;
(i) $sc_1$ Coarse Synthesizer Ratio For Channel 1;
(j) $sc_2$ Coarse Synthesizer Ratio For Channel 2;
(k) $sc_{up}$ Uplink Channel Coarse Synthesizer Ratio;
(l) $sf_1$ Fine Synthesizer Ratio For Channel 1;
(m) $sf_2$ Fine Synthesizer Ratio For Channel 2;
(n) $sf_{up}$ Uplink Channel Fine Synthesizer Ratio;
(o) $error_1$ Error Measured In Carrier Tracking Loop For Channel 1;
(p) $error_2$ Error Measured In Carrier Tracking Loop For Channel 2;

thus, $$(f_{dro}+\delta)+(f_{reflo}+\epsilon)\cdot(sc_n+sf_n)-fc_n=error_n; \qquad (1)$$

$$\delta+\epsilon\cdot(sc_1+sf_1)=error_1+fc_1-f_{dro}-(sc_1+sf_1)\cdot f_{reflo}; \qquad (2)$$

$$\delta+\epsilon\cdot(sc_2+sf_2)=error_2+fc_2-f_{dro}-(sc_2+sf_2)\cdot f_{reflo}; \qquad (3) \text{ and}$$

$$(f_{dro}+\delta)+(f_{reflo}+\epsilon)\cdot(sc_{up}+sf_{up})-fc_{up}=f_{NCOup}. \qquad (4)$$

Equation (1) describes the frequency relationships in the receiver, and if one tunes to two unique channels, the system of equations (2) and (3) is established. This system (equations (2) and (3)) can be solved for $\delta$ and $\epsilon$. These variables can be applied to equation (4) to compute $f_{NCOup}$ the expected error in uplink carrier frequency caused by the $f_{dro}$ and $f_{reflo}$ errors. Of course, this technique could also be applied in the case where the coarse and fine conversions are replaced by a single conversion.

While this invention has been described as having a preferred design, the present invention can be further modified within the spirit and scope of this disclosure. For example, the ground system could lock the references to a satellite based reference. In any case, this application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. An outdoor unit for a satellite television ground system comprising:
    downlink circuitry operative to receive a satellite television signal from a satellite, frequency lock to the satellite television signal, process the satellite television signal, and provide the processed satellite television signal to an indoor unit of the satellite television ground system; and
    uplink circuitry operative to receive an uplink signal from the indoor unit, process the received uplink signal, and transmit the processed uplink signal to the satellite only when said downlink circuitry is simultaneously receiving said satellite television signal from said satellite and is frequency locked to said satellite television signal from said satellite.

2. The outdoor unit of claim 1, wherein the uplink circuitry is further operative to receive an uplink control signal from the indoor unit indicating said downlink circuitry being frequency locked to the satellite television signal.

3. The outdoor unit of claim 2, wherein the uplink control signal comprises an uplink data signal and an uplink oscillator signal.

4. The outdoor unit of claim 3, wherein the uplink oscillator signal is derived from the satellite television signal.

5. The outdoor unit of claim 4, wherein the uplink oscillator signal is derived from a frequency conversion error data from the satellite television signal.

6. An outdoor unit for a satellite television ground system comprising:
    means for receiving a satellite television signal from a satellite;
    means for processing the satellite television signal;
    means for providing the processed satellite television signal to an indoor unit of the satellite television ground system;
    means for receiving an uplink signal from the indoor unit;
    means for processing the received uplink signal; and
    means for providing the processed uplink signal to said satellite only when said means for receiving is receiving the satellite television signal from said satellite and is frequency locked to said satellite television signal from said satellite.

7. The outdoor unit of claim 6, further comprising:
    means for receiving an uplink control signal indicating a frequency locked condition to signals from the satellite from the indoor unit.

8. The outdoor unit of claim 7, wherein the uplink control signal comprises an uplink data signal and an uplink oscillator signal.

9. The outdoor unit of claim 8, wherein the uplink oscillator signal is derived from the satellite television signal.

10. The outdoor unit of claim 9, wherein the uplink oscillator signal is derived from a frequency conversion error data from the satellite television signal.

11. In an outdoor unit of a satellite television ground system, a method of providing an uplink communication with a television broadcasting satellite comprising the steps of:
    receiving a satellite television signals from a satellite;
    processing the satellite television signal;
    providing the processed satellite television signal to an indoor unit of the satellite television ground system;
    receiving an uplink signal from the indoor unit;
    processing the received uplink signal; and
    providing the processed uplink signal to the satellite while simultaneously receiving the satellite television signal from said satellite and receiving an uplink control signal indicating a frequency locked condition to said satellite television signal from said satellite.

12. The method of claim 11, wherein the uplink control signal comprises an uplink data signal and an uplink oscillator signal.

13. The method of claim 12, wherein the uplink oscillator signal is derived from the satellite television signal.

14. The method of claim 13, wherein the uplink oscillator signal is derived from frequency conversion error data from the satellite television signal.

* * * * *